UNITED STATES PATENT OFFICE.

HUBER H. ROOT, OF MEDINA, OHIO.

FOOD COMPOUND.

1,158,297.     Specification of Letters Patent.     Patented Oct. 26, 1915.

No Drawing.     Application filed January 2, 1914. Serial No. 810,017.

*To all whom it may concern:*

Be it known that I, HUBER H. ROOT, of Medina, in the county of Medina and in the State of Ohio, have invented a certain new and useful Improvement in Food Compounds, and do hereby declare that the following is a full, clear, and exact description thereof.

My invention relates to food products and my object is to promote the use of honey because it is preferable to other forms of sweets, such as cane sugar, since honey is a predigested sweet, that is it is invert sugar, so that it can be assimilated much more readily than other forms of sweets; and in particular my object is to provide a confection formed by the combination of peanuts and honey.

In forming my confection or food product, I grind or pulverize peanuts and then thoroughly mix the same and honey, the honey being used either in the comb form or in a liquid form, or I may form my product by the mixture of peanut butter and honey. Ordinarily peanut butter is distasteful to some persons so that by the addition of the honey thereto and the impartation of the honey flavor it is made acceptable to them. The compound of honey and peanut butter does not have the dryness that simply peanut butter has and it is more readily and comfortably eaten than is ordinary peanut butter because it does not clog in the mouth. The compound is of substantially uniform consistency throughout, in which respects it differs from ordinary peanut butter which is usually thin at the top of the jar and thick at the bottom so that that which is used first is likely to be too thin, while as the bottom of the jar is approached it is exceedingly dry and difficult to spread when used after the manner of ordinary butter. Since honey has an affinity for water it will absorb moisture from the air and thus prevent the mixture drying out and becoming unfit for use, as sometimes happens in the case of peanut butter.

While I do not limit myself to any particular proportion of the ground peanuts or the peanut butter and honey, I recommend a mixture of two parts of peanuts or the peanut butter and one of honey, as this satisfactorily produces the physical conditions I have above described and provides honey enough to impart the desired flavor.

Having thus described my invention what I claim is—

1. A food compound in the form of an article of manufacture consisting of a mixture of ground peanuts and honey.

2. A food compound in the form of an article of manufacture consisting of a mixture of ground peanuts and honey, the honey and peanuts proportioned substantially as described.

3. A food compound in the form of an article of manufacture, consisting of a mixture of ground peanuts and honey, the elements being in the proportion of two parts of the peanut element to one of the honey element.

In testimony that I claim the foregoing I have hereunto set my hand.

HUBER H. ROOT.

Witnesses:
    E. R. ROOT,
    FRANK SPELLMAN..